(No Model.)

W. J. McTIGHE.
NUT LOCK.

No. 282,348. Patented July 31, 1883.

WITNESSES:
John M. Patterson
T. J. Patterson

William J. McTighe, INVENTOR
Connolly Bros & McTighe
ATTORNEYS

UNITED STATES PATENT OFFICE.

WILLIAM J. McTIGHE, OF PITTSBURG, PENNSYLVANIA.

NUT-LOCK.

SPECIFICATION forming part of Letters Patent No. 282,348, dated July 31, 1883.

Application filed March 22, 1883. (No model.)

*To all whom it may concern:*

Be it known that I, WILLIAM J. MCTIGHE, of Pittsburg, in the county of Allegheny and State of Pennsylvania, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

The object of this invention is to provide a simple, cheap, and efficient device for locking nuts on track-bolts and other places; and the invention consists in a washer or plate having a hole whose edge is formed into a spiral or helical shape, with a notch where the said edge begins and ends, thus adapting the plate to be used like a nut and to be screwed onto a bolt.

Figure 1:
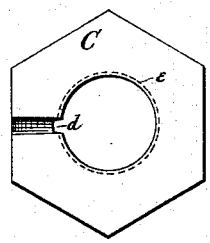
Figure 2:
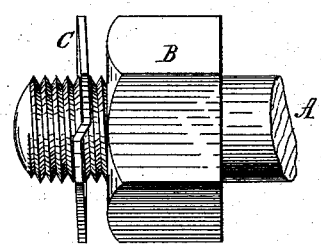
Figure 3:
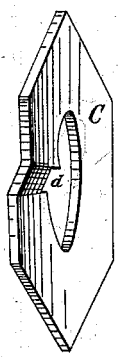

Figure 1 is a plan view of my locking-washer. Fig. 2 is a side view of a bolt and nut with the locking-washer in place. Fig. 3 is a perspective view of the locking-washer.

A is an ordinary bolt, and B its nut.

C is a plate, which is best struck up out of sheet metal, and having the edge of its hole pressed or otherwise formed into a helical shape, like a thread on a nut, and at the point where the threaded or helical edge begins and ends a notch, $d$, is cut, the plate radially from notch $d$ being inclined, as shown, to accommodate the shape given the plate C. By this construction the plate is adapted to be used like a nut, the notch $d$ permitting its entrance on the thread of a bolt.

The plates will be made in various sizes of hole, and in using the lock a size will be selected to properly fit the bolt.

The outer edge of plate C can be square or hexagonal, to adapt it for use with a wrench. When screwed down tightly against the nut which it is designed to lock, the plate C performs the office of a jamb-nut and holds the nut securely in position.

If desired, one or more corners of the plate C, on its outer edge, may be bent down over the nut; but this is not essential. Also, the inner edge of the plate may be rounded or V-shaped to more closely fit the threads of the bolt.

I claim as my invention—

The improved nut-lock, consisting of the continuous plate C or washer, having a central hole whose edge is formed helical, and having notch $d$ where said helical edge begins and ends, substantially as described.

In testimony that I claim the foregoing as my own I have hereto affixed my signature in presence of two witnesses.

WILLIAM J. McTIGHE.

Witnesses:
T. J. PATTERSON,
T. J. McTIGHE.